United States Patent [19]

Blum

[11] 4,242,289
[45] Dec. 30, 1980

[54] APPARATUS FOR THE REMOVAL OF GASES, ESPECIALLY AIR, IN FLUIDS

[76] Inventor: Albert Blum, Scheiderhohe, 5204 Lohmar (Rhld.) 1, Fed. Rep. of Germany

[21] Appl. No.: 39,138

[22] Filed: May 15, 1979

Related U.S. Application Data

[63] Continuation-in-part of Ser. No. 737,399, Nov. 1, 1976, Pat. No. 4,155,959.

[30] Foreign Application Priority Data

Oct. 31, 1975 [DE] Fed. Rep. of Germany ....... 2548754

[51] Int. Cl.³ .............................................. B01F 3/04
[52] U.S. Cl. .................................... 261/93; 210/219; 210/220; 261/DIG. 75; 415/207; 417/84
[58] Field of Search .................... 261/28, 29, 77, 34 R, 261/36 R, 76, 87, 91, 93, 121 M, DIG. 75; 210/219, 220, 221 M, 221 P; 209/169, 170; 415/204, 206, 207; 417/76, 84

[56] References Cited

U.S. PATENT DOCUMENTS

| | | | |
|---|---|---|---|
| 1,148,992 | 8/1915 | Seaver, Jr. | 417/84 |
| 1,598,858 | 9/1926 | Greenawalt | 261/77 X |
| 2,280,979 | 4/1942 | Rocke | 261/93 X |
| 2,791,968 | 5/1957 | Rupp | 417/84 X |
| 3,391,858 | 7/1968 | De Lancey | 417/84 X |
| 3,524,629 | 8/1970 | Culwell | 261/91 X |
| 3,663,117 | 5/1972 | Warren | 261/DIG. 75 |
| 3,780,998 | 12/1973 | Botsch | 261/91 |
| 3,829,068 | 8/1974 | Hohne | 261/36 R |
| 3,904,393 | 9/1975 | Morse | 261/DIG. 75 |
| 4,029,724 | 6/1977 | Muller et al. | 261/93 X |
| 4,139,579 | 2/1979 | Blum | 417/84 X |
| 4,155,959 | 5/1979 | Blum | 261/DIG. 75 |

FOREIGN PATENT DOCUMENTS

| | | | |
|---|---|---|---|
| 2231061 | 1/1974 | Fed. Rep. of Germany | 261/93 |
| 2516371 | 10/1975 | Fed. Rep. of Germany | 261/DIG. 75 |
| 16099 | of 1890 | United Kingdom | 261/29 |
| 942754 | 11/1963 | United Kingdom | 261/DIG. 75 |

Primary Examiner—Richard L. Chiesa
Attorney, Agent, or Firm—Diller, Ramik & Wight

[57] ABSTRACT

An aerator device which includes a submersible unitized electric motor-pump assembly designed by a housing in which is an electric motor having a shaft projecting therefrom and carrying a pump impeller, a second housing having a liquid chamber in which is located the pump impeller, a first opening in the second housing through which the pump impeller is insertable into the liquid chamber, a second opening in the second housing in general axial alignment with the first opening through which liquid is drawn into the liquid chamber, first and second plurality of nozzles arranged in generally axially aligned pairs for directing a liquid discharge from the liquid chamber in generally radially outwardly directed streams to atmosphere, and an aerator chamber opening into individual aerator chambers between the pairs of nozzles for aerating the liquid prior to the discharge thereof into a body of water within which the device is adapted to be submerged.

26 Claims, 5 Drawing Figures

4,242,289

APPARATUS FOR THE REMOVAL OF GASES, ESPECIALLY AIR, IN FLUIDS

INTRODUCTION AND BACKGROUND OF THE INVENTION

This application is a continuation-in-part of application Ser. No. 737,399 in the name of Albert Blum, filed Nov. 1, 1976 entitled Apparatus for the Removal of Gases, Especially Air, in Fluids, and now U.S. Pat. No. 4,155,959.

This invention relates to a device for the introduction of gaseous medium such as air into liquid such as drain water, the device being of the kind which withdraws a portion of the liquid to be aerated and discharges it under pressure through at least one nozzle element by which the liquid passes through a space filled with air of which part is entrained in an ejector nozzle through which these mixed portions of the liquid and air are returned into the fluid to be aerated.

There are known radiating aerators of this kind in which the liquid is passed under pressure into an inner chamber from which it is discharged through nozzle elements arranged spaced and angularly displaced in relation to one another into an outer chamber surrounding the inner chamber, the outer chamber being connected to an air supply conduit and having nozzle elements arranged to be complementary to the nozzle elements of the inner chamber, whereby the outer chamber nozzle elements receive the liquid jets from the inner chamber nozzle elements and return the liquid with entrained air into the bulk of the liquid to be aerated.

These so-called radiating aerators must, however, be supplied with both the air and the liquid through special pumps or compressors, which may be mounted within or externally of the bulk of the liquid and must be connected through appropriate connection conduits to the radiating aerators.

One object of the invention is to be provided a simplified form of construction in which there are substantially avoided not only the connection conduits between the radiating aerator and the pump or compressor and the appertaining costs of mounting the same, but in which also there can be used the very convenient pumps or motor-pump assemblies which are known as submersible pumps or as submersible motor-pump assemblies comprising electric motors and pumps connected therewith, in order thereby to furnish very effective aerating devices in a simple manner.

A further object of this invention is the provision of a novel aerator device which includes a submersible unitized electric motor-pump assembly of which an electric motor is housed in the first housing and includes a shaft projecting therefrom which carries a pump impeller, a second housing defining a liquid chamber in which is located the pump impeller, a first opening through which the pump impeller is insertable into the liquid chamber, a second opening in general axial alignment with the first opening through which liquid is drawn into the liquid chamber, first and second pluralities of nozzles arranged in generally coaxial pairs for directing liquid discharged from the liquid chamber to atmosphere, and means for aerating streams of liquid issuing from innermost ones of the nozzles prior to the aerated streams being discharged from the outermost of the nozzles.

Still another object of this invention is to provide a novel aerator device of the type heretofore set forth including a plurality of stationary vanes between the pump impeller and the first plurality of nozzles for directing liquid along individual flow paths from the liquid chamber toward the first plurality of nozzles.

Yet another object of this invention is to provide a novel aerator device of the type heretofore set forth wherein aerating means are defined by an annular air chamber disposed in axially offset relationship to the nozzles, and openings placing the annular air chamber in fluid communication with individual chambers between cooperative pairs of nozzles of the first and second plurality of nozzles.

BRIEF SUMMARY OF THE INVENTION

For this purpose, in a radiating aerator of the initially mentioned kind, with an inner pressure chamber connectable to the pressure delivery outlet of a pump, and a second outer air chamber surrounding the pressure chamber and connectable to an air supply conduit, in the walls of which chambers distributed in angularly displaced manner and spaced from one another there are arranged nozzle elements, the invention provides that the inner pressure chamber is formed as an annular or substantially annular chamber into the central opening of which can be inserted the propelling pump. In this connection, it is recommended to select the arrangement and the dimensions so that the delivery outlet of the propelling pump can be connected directly to the inlet of the pressure chamber.

FURTHER DESCRIPTION AND ADVANTAGES OF THE INVENTION

In favorable circumstances, the delivery outlet of the pump can be coupled directly by means of its coupling flange directly to the inlet of the pressure chamber. However, usually in each instance it will be possible to effect the connection of the pump pressure delivery outlet and the pressure chamber of the radiating aerator with simple fastening elements.

In many instances it is convenient to suit the inner periphery of the central opening of the aerator to the outer periphery of the pump housing, and in some instances the boundary of the central opening in the aerator can be formed to constitute the pump housing in which can be mounted merely the pump impeller wheel connected to the shaft of the driving motor.

In a particularly favorable construction, the device comprises a submersible electric motor-pump assembly, a substantially annular inner chamber closely surrounding said pump and connected to the delivery thereof, a substantially annular outer chamber surrounding said inner chamber, an air supply conduit connected to said outer chamber, and a plurality of nozzle elements constituting ejector nozzles in the boundaries of said inner chamber and said outer chamber whereby liquid escapes from said inner chamber and entrains air from said outer chamber and is discharged in the form of aerating jets.

The invention permits many possibilities of embodiment. In the accompanying drawings, there is illustrated one embodiment of a device in accordance with the invention, somewhat diagrammatically and showing those parts which are important for the comprehension of the invention.

BRIEF DESCRIPTION OF THE VIEWS IN THE DRAWINGS

In the accompanying drawings:

FIG. 1 shows one form of embodiment of an aerating device in accordance with the invention in operation in a drain water tank, and FIG. 2 shows a view in section approximately on the line 2—2 in FIG. 1, and FIG. 3 is an axial sectional view of another aerator device of this invention, and illustrates a submersible electric motor having a shaft carrying a pump impeller disposed in a liquid chamber of a housing carrying generally radially disposed vanes for effecting liquid flow toward pluralities of generally axially aligned inner and outer nozzles, and FIG. 4 is a fragmentary top plan view with portions broken away for clarity of the aerator device of FIG. 3, and illustrates with more detail the stationary vanes and the axially aligned nozzles, and FIG. 5 is a view similar to FIG. 3, and illustrates an aerating air chamber of an annular configuration which is disposed between the innermost and outermost plurality of nozzles.

DETAILED DESCRIPTION OF THE PREFERRED EMBODIMENTS

Figure 1:
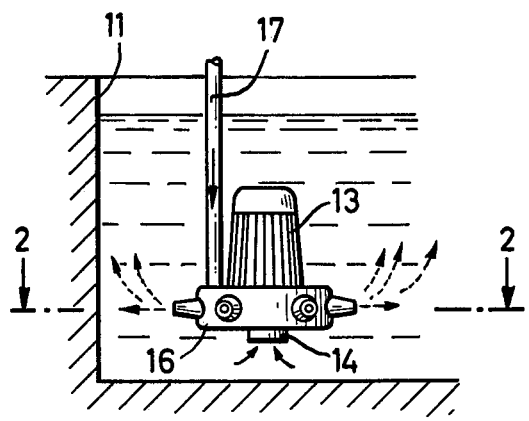
Figure 2:
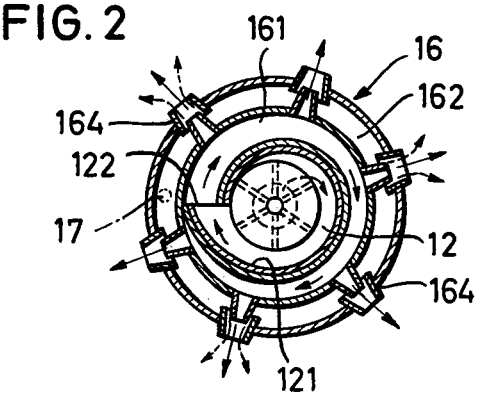

With reference to the aerating device shown in a very schematic manner in FIG. 1, which device serves for the aeration of drain water in a drain water tank 11, there will be explained the manner of operation and construction of the device. With the aid of a pump 12 (FIG. 2) which is driven by an electric motor 13 and forms therewith a submersible motor-pump assembly, a portion of the drain water liquid is sucked in through a suction intake 14. The motor-pump assembly formed of the electric motor 13 and the pump 12 is completely submersible in the liquid medium to be impelled. The pump 12 has a spiral pump housing 121, which is surrounded by an aerator 16. In the illustrated example of the embodiment the aerator 16 has a central opening of which the inner periphery is suited to the outer periphery of the pump housing 121, so that this latter can be mounted without difficulty in the central opening of the annular aerator 16.

The pressure delivery outlet 122 of the pump housing 121 is directly in connection with the inlet of an inner substantially annular first chamber 161 serving as the pressure chamber of the aerator 16. From the pressure chamber 161, the impelled liquid medium arrives at inner nozzle elements 163, which are shown as individual nozzle elements mounted in the wall of the chamber 161 but which could be constituted by one or more nozzle slots or openings in this wall. From the nozzle elements 163, the impelled liquid medium is ejected to the form of jets which pass through an outer second air chamber 162, which is in connection with an air supply conduit 16. After passing through the air chamber 162, the liquid jets ejected radially from the nozzle elements 163 are received by entraining nozzle elements 164 which are provided in the outer wall of the annular air chamber 162. There is one nozzle element 163 respective to each nozzle element 164 in order to constitute a plurality of effective ejector nozzles from which the impelled liquid together with the entrained air is returned into the bulk of the drain water in the tank 11.

Figure 3:
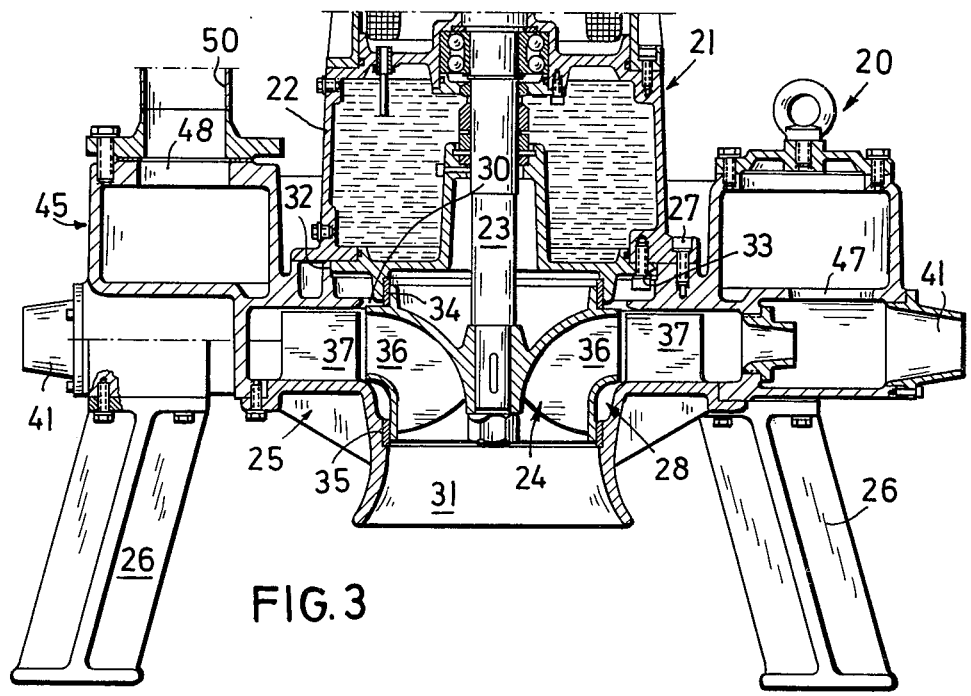
Figure 4:
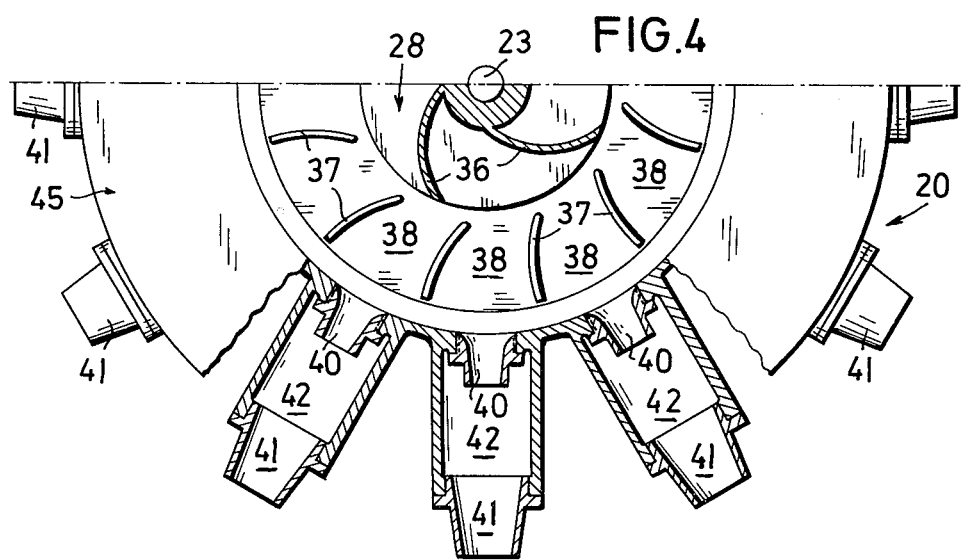

Reference is now made to FIGS. 3 and 4 of the drawings which fully illustrate another aerator device constructed in accordance with this invention which is generally designated by the reference numeral 20 and includes a submersible unitized electric motor-pump assembly 21 defined by a first housing 22 having a shaft 23 projecting axially downwardly therefrom and having conventionally secured to a lower end portion (unnumbered) thereof a pump impeller 24.

The electric motor-pump assembly 21 is fastened to a second housing 25 supported by a plurality of legs 26 by means of conventional fasteners 27. The housing 25 includes a generally circular liquid chamber 28 having a first opening 30 and a second opening 31, the latter of which functions as an inlet for liquid to be drawn into the liquid chamber 28 upon rotation of the impeller 24 by the electric motor (unnumbered) of the electric motor-pump assembly 21. The diameter of the opening 30 is slightly larger than the outermost major diameter of the impeller 24 to permit the impeller 24 to be introduced into the liquid chamber 28 through the opening 30. The housing 22 of the electric motor-pump assembly 21 also includes a peripheral wall 32 which is received in and is located by a wall 33 of the housing 25. The mating relationship between the walls 32,33 assure that the axis of the shaft 23 and of the impeller 24 is coaxial to that of the openings 30, 31. The housings 22, 25 carry respective seals 34, 35 with the latter also functioning as means for additionally aligning the shaft 23 coaxial to the openings 30, 31.

The impeller 24 includes a plurality of vanes 36 (FIG. 4) which discharge liquid within the liquid chamber 28 in a generally radially outwardly direction toward and through a plurality of stationary, slightly curved vanes 37 (FIG. 4) which define passages 38 between adjacent vanes 37. The passages 38 serve to direct the flow of the liquid in a generally radially outwardly direction toward each of a plurality of nozzles 40 disposed in generally equally spaced circumferential relationship about the axis of the shaft 23 immediately outboard of the stationary vanes 37. Each of the nozzles 40 is in axial alignment with an outermost nozzle 41 and between each of the aligned nozzles 40, 41 is an individual aeration chamber 42. Each aeration chamber 42 defines in part means for aerating the liquid as it passes through the individual chambers 42 and prior to being discharged outwardly of the nozzles 41 into a body of water within which the device is adapted to be submerged. The totality of the aerating means or mechanism is generally designated by the reference numeral 45 and includes an annular chamber 46 above or in axially upwardly offset relationship to the plurality of nozzles 40, 41, as is best illustrated in FIG. 3. The annular chamber 46 is placed in fluid communication with each of the individual aerating chambers 44 through suitable openings 47 with there being one opening 47 for each of the individual aeration chambers 42. The annular chamber 46 is also placed in fluid communication with a source of pressurized air through an opening 48 (FIG. 3) and a flexible hose or nozzle 50. The hose or nozzle 50 may be, for example, connected to an air pump or a similar conventional source of air pressure. The conduit or pipe 50 may also simply be led to atmosphere and the air within the annular chamber 46 will be sucked through the openings 47 by a venturi effect as the individual air streams exit the nozzles 40 and pass through the individual air chambers 42 into and through the nozzles 41. Thus, aeration of the liquid occurs as it exits each of the nozzles 40 within each of the individual aeration chambers 42 and prior to the exodus thereof in individual streams outwardly of the nozzles 41.

Figure 5:
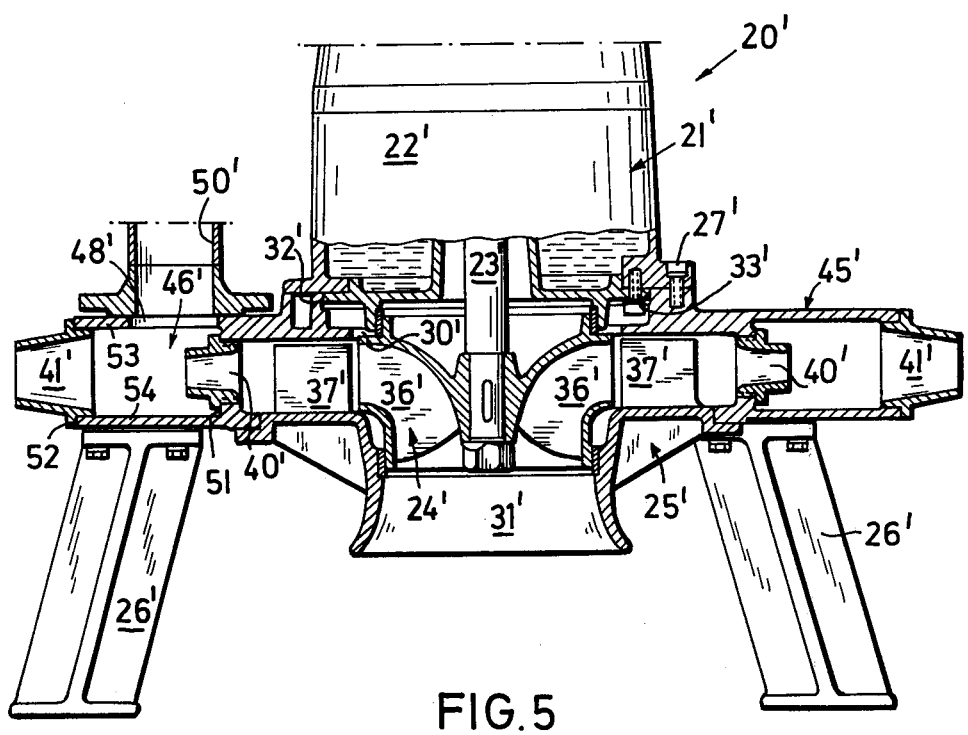

Reference is made to FIG. 5 which illustrates another aerator device similar to that shown in FIGS. 3 through 4 and like parts carry the same though primed reference numerals. The only difference between the device 20 of FIGS. 3 and 4 and the device 20' of FIG. 5 is that the aeration chamber 45' is not axially offset from the nozzles 40',41'. Instead the aeration or aerator chamber 45' is defined by a generally continuous circular inner wall 51, an outer wall 52, an upper annular wall 53 and a lower annular wall 54 which collectively define the annular chamber 46'. The nozzles 40', 41' are housed in openings (unnumbered) of the respective walls 51, 52.

In this manner, the aeration chamber or housing 45' defines a continuous annular chamber 46' which surrounds the plurality of nozzles 40' and is generally disposed between the latter nozzles and the outermost plurality of nozzles 41'. Air is, however, similary introduced into the annular chamber 46' through the conduit 50' and the opening 48' and liquid exiting each of the nozzles 40' is areated within the annular chamber 46' before eventually being discharged through the nozzles 41' into a submerged media.

Although only a preferred embodiment of the invention has been specifically illustrated and described herein, it is to be understood that minor variations may be made in the apparatus without departing from the spirit and scope of the invention, as defined in the appended claims.

I claim:

1. An aerator device comprising a submersible unitized electric motor-pump assembly, said assembly including a first housing within which is an electric motor and a shaft projecting outwardly therefrom carrying a pump impeller, a second housing having a liquid chamber in which is located said pump impeller, means in said second housing for defining a first opening through which said pump impeller is insertable into said liquid chamber, means in said second housing for defining a second opening in general axial alignment with said first opening through which liquid is drawn into said liquid chamber, means for removably securing together said first and second housings, a first plurality of nozzles for directing liquid discharged from said liquid chamber in generally radially outwardly directed streams, and means for aerating said streams prior to the discharge thereof into a body of water within which said device is adapted to be submerged.

2. The aerator device as defined in claim 1 including means between said first and second housings for locating said shaft in generally coaxial relationship with said second opening.

3. The aerator device as defined in claim 2 including a second plurality of nozzles for discharging said aerated streams generally radially outwardly into the body of water within which the device is adapted to be submerged.

4. The aerator device as defined in claim 2 including a second plurality of nozzles for discharging said aerated streams generally radially outwardly into the body of water within which the device is adapted to be submerged, said first and second nozzles being disposed in generally axially aligned pairs, and said aerating means being operative to aerate liquid with air after the liquid is directed outwardly of said first plurality of nozzles.

5. The aerator device as defined in claim 2 including a second plurality of nozzles for discharging said aerated streams generally radially outwardly into the body of water within which the device is adapted to be submerged, and a plurality of means between said pump impeller and said first plurality of nozzles for directing liquid along individual flow paths from said liquid chamber toward said first plurality of nozzles.

6. The aerator device as defined in claim 1 including means between said pump impeller and said second housing for locating said shaft in generally axial relationship with said second opening.

7. The aerator device as defined in claim 1 including means between said pump impeller and said second opening defining means for locating said shaft in generally axial relationship with said second opening with a portion of said pump impeller within said second opening.

8. The aerator device as defined in claim 1 including a second plurality of nozzles for discharging said aerated streams generally radially outwardly into the body of water within which the device is adapted to be submerged.

9. The aerator device as defined in claim 1 including a second plurality of nozzles for discharging said aerated streams generally radially outwardly into the body of water within which the device is adapted to be submerged, said first and second nozzles being disposed in generally axially aligned pairs, and said aerating means being operative to aerate liquid with air after the liquid is directed outwardly of said first plurality of nozzles.

10. The aerator device as defined in claim 1 including a second plurality of nozzles for discharging said aerated streams generally radially outwardly into the body of water within which the device is adapted to be submerged, and a plurality of means between said pump impeller and said first plurality of nozzles for diverting liquid along individual flow paths from said liquid chamber toward said first plurality of nozzles.

11. The aerator device as defined in claim 10 wherein said liquid directing means are a plurality of stationary vanes.

12. The aerator device as defined in claim 11 including a second plurality of nozzles for discharging said aerated streams generally radially outwardly into the body of water within which the device is adapted to be submerged.

13. The aerator device as defined in claim 11 including a second plurality of nozzles for discharging said aerated streams generally radially outwardly into the body of water within which the device is adapted to be submerged, said first and second nozzles being disposed in generally axially aligned pairs, and said aerating means being operative to aerate liquid with air after the liquid is directed outwardly of said first plurality of nozzles.

14. The aerator device as defined in claim 11 wherein said aerating means is defined in part by an annular air chamber disposed in axially offset relationship to said first plurality of nozzles.

15. The aerator device as defined in claim 1 including a plurality of nozzles for diverting liquid along individual flow paths from said liquid chamber toward said first plurality of nozzles.

16. The aerator device as defined in claim 1 wherein said aerating means is defined by a totally stationary annular air chamber disposed in axially offset relationship to said first plurality of nozzles.

17. The aerator device as defined in claim 1 wherein said aerating means is defined by a totally stationary annular air chamber disposed in axially offset relationship to said first plurality of nozzles, and means for placing said annular air chamber in fluid communication with each of said first plurality of nozzles.

18. The aerator device as defined in claim 1 including a second plurality of nozzles for discharging said aerated streams generally radially outwardly into the body of water within which the device is adapted to be submerged, said aerating means including a separate, individual aerating chamber between one each of said first and second plurality of nozzles, and means for introducing air separately into each of said individual separate aerating chambers.

19. The aerator device as defined in claim 1 wherein said first and second openings are in axial alignment about a generally vertical axis, and said first opening is vertically above said second opening.

20. The aerator device as defined in claim 19 including a second plurality of nozzles for discharging said aerated streams generally radially outwardly into the body of water within which the device is adapted to be submerged, said first and second nozzles being disposed in generally axially aligned pairs, a plurality of stationary vanes between said pump impeller and said first plurality of nozzles for directing liquid along individual flow paths from said liquid chamber toward said first plurality of nozzles, said aerating means being defined in part by a totally stationary annular air chamber disposed in axially offset relationship vertically above said first and second nozzles, said aerating means including a separate individual chamber between one each of said first and second plurality of nozzles, and means for introducing air into each of said individual separate aerating chambers.

21. The aerator device as defined in claim 19 including first and second means between said pump impeller and said first and second openings, respectively, for locating said shaft in generally axial relationship with said first and second openings.

22. The aerator device as defined in claim 1 wherein said pump impeller includes a plurality of radially outwardly directed vanes for directing liquid radially outwardly of said liquid chamber, and said first plurality of nozzles being in radial alignment with said radially outwardly directed pump impeller vanes.

23. The aerator device as defined in claim 22 including a second plurality of nozzles for discharging said aerated streams generally radially outwardly into the body of water within which the device is adapted to be submerged, said first and second nozzles being disposed in generally axially aligned pairs, a plurality of stationary vanes between said pump impeller and said first plurality of nozzles for directing liquid along individual flow paths from said liquid chamber toward said first plurality of nozzles, said aerating means being defined in part by a totally stationary annular air chamber disposed in axially offset relationship vertically above said first and second nozzles, said aerating means including a separate individual chamber between one each of said first and second plurality of nozzles, and means for introducing air into each of said individual separate aerating chambers.

24. The aerator device as defined in claim 22 wherein said first and second openings are in axial alignment about a generally vertical axis, and said first opening is vertically above said second opening.

25. The aerator device as defined in claim 24 including a second plurality of nozzles for discharging said aerated streams generally radially outwardly into the body of water within which the device is adapted to be submerged, said first and second nozzles being disposed in generally axially aligned pairs, a plurality of stationary vanes between said pump impeller and said first plurality of nozzles for directing liquid along individual flow paths from said liquid chamber toward said first plurality of nozzles, said aerating means being defined in part by a totally stationary annular air chamber disposed in axially offset relationship vertically above said first and second nozzles, said aerating means including a separate individual chamber between one each of said first and second plurality of nozzles, and means for introducing air into each of said individual separate aerating chambers.

26. An aerator device comprising a submersible unitized electric motor-pump assembly, said assembly including a first housing within which is an electric motor and a shaft projecting outwardly therefrom carrying a pump impeller, a second housing having a liquid chamber in which is located said pump impeller, means in said second housing for defining a first opening through which said pump impeller is insertable into said liquid chamber, means in said second housing for defining a second opening in general axial alignment with said first opening through which liquid is drawn into said liquid chamber, means for removably securing together said first and second housings, a first plurality of nozzles for directing liquid discharged from said liquid chamber in generally radially outwardly directed streams, means for aerating said streams prior to the discharge thereof into a body of water within which said device is adapted to be submerged, means between said pump impeller and said second opening defining means for locating said shaft in generally axial relationship with said second opening with a portion of said pump impeller within said second opening, a second plurality of nozzles for discharging said aerated streams generally radially outwardly into the body of water within which the device is adapted to be submerged, said first and second nozzles being disposed in generally axially aligned pairs, said aerating means being operative to aerate liquid with air after the liquid is directed outwardly of said first plurality of nozzles, a plurality of means between said pump impeller and said first plurality of nozzles for diverting liquid along individual flow paths from said liquid chamber toward said first plurality of nozzles, said aerating means being defined in part by a totally stationary annular air chamber disposed in axially offset relationship to said first plurality of nozzles, said aerating means further including a separate individual aerating chamber between one each of said first and second plurality of nozzles, means for introducing air into each of said individual separate aerating chambers, and said liquid directing means being a plurality of stationary vanes.

* * * * *